W. H. DAY.
PINCH COCK.
APPLICATION FILED JAN. 14, 1916.
1,250,985. Patented Dec. 25, 1917.
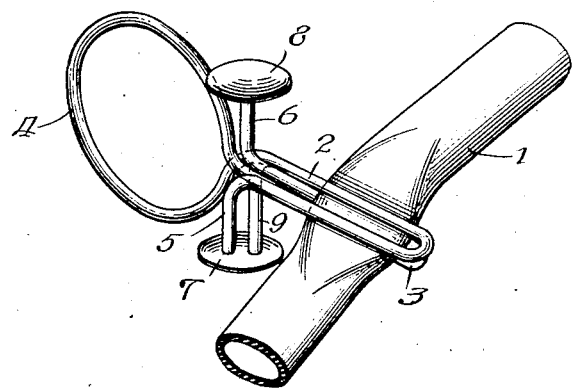
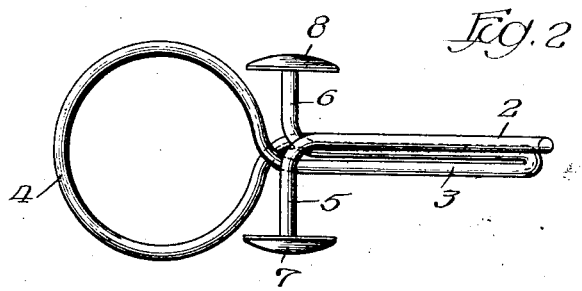
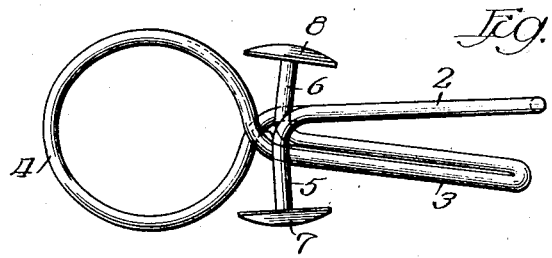
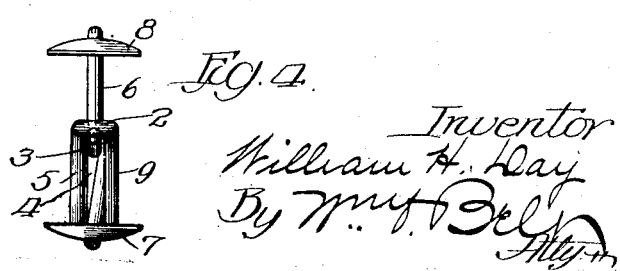
Witnesses
Inventor
William H. Day

UNITED STATES PATENT OFFICE.

WILLIAM H. DAY, OF GUELPH, ONTARIO, CANADA.

PINCH-COCK.

1,250,985. Specification of Letters Patent. Patented Dec. 25, 1917.

Application filed January 14, 1916. Serial No. 72,019.

*To all whom it may concern:*

Be it known that I, WILLIAM H. DAY, a subject of the King of Great Britain, residing at Guelph, in the Province of Ontario and the Dominion of Canada, have invented certain new and useful Improvements in Pinch-Cocks, of which the following is a specification.

This invention relates to pinch cocks particularly adapted for use with flexible fluid-conveying tubing.

Pinch cocks are universally used in laboratories in connection with chemical and physical apparatus where it is necessary to control the flow of fluids in flexible tubing and particularly where apparatus of an inexpensive or temporary character is needed.

All forms of pinch cocks heretofore known have been subject to the disadvantages that the tubing must be threaded into the device between the closed ends thereof. This is frequently a great inconvenience, especially where the necessity of a pinch cock arises after the apparatus is partially set up or where by reason of breakage it becomes desirable to quickly shut off the flow of fluid through tubing more or less permanently attached at both ends to the apparatus. Furthermore, in many forms of apparatus the necessity for a pinch cock arises only at infrequent intervals and with the older forms of pinch cock must be left hanging on the tubing where it serves no useful purpose.

It is the object of my invention to provide a pinch cock of simple form and inexpensive construction having an outwardly opening jaw, the ends of which are free, and which may be readily slipped over the tubing without the necessity of threading the tubing between the ends of the pinch cock.

Other objects and advantages of my invention will be apparent as it is better understood by reference to the following specification when read in connection with the accompanying drawing in which—

Figure 1 is a perspective view of my improved pinch cock, illustrating the manner in which it is applied to the tubing;

Fig. 2 is a side elevation of my invention showing the jaw closed;

Fig. 3 is a similar view showing the jaw open, and

Fig. 4 is an end elevation of the pinch cock.

Referring to the drawing, 1 indicates a section of tubing to which a pinch cock according to my invention has been applied and indicates the manner in which the jaw pinches the tubing to prevent the flow of fluid therethrough. Fig. 1 clearly illustrates the advantage of my invention which consists principally in the ability of the operator to slip the tubing 1 between the open ends of the jaw without threading the tubing through the pinch cock as has heretofore been the common practice.

My improved pinch cock comprises a pair of arms 2 and 3, consisting preferably of wire bent upon itself in normal directions in the respective arms 2 and 3, the two sides of the arm 2 being spaced slightly apart to form a seat in which the arm 3 rests when the jaw is closed and not in use. As will be seen from an inspection of Fig. 1 of the drawings, the tubing 1, when the device is in use, is forced slightly into the opening between the sides of the arms 2 by the coöperating arm 3 and an absolutely tight joint is assured.

Formed integrally with the arms 2 and 3 is a spring 4 preferably circular in form which normally holds the arms 2 and 3 in engagement and when the device is in use pinches the tubing 1 between the arms. In order that the device may be readily operated, the ends of the wire forming the arms 2 and 3 are bent outwardly at 5 and 6, respectively, and provided with manually operable buttons 7 and 8. To strengthen the device and provide a guide for the arm 3 a wire 9 is secured by solder or in any other suitable manner to the button 7 and to the arm 2. It will be noted that the means for operating the pinch cock is disposed between the spring 4 and the open ends of the arms 2 and 3, so that the operator is permitted to pinch the tubing in the jaw without threading the tubing through the device.

The structure and mode of operation of my invention should be understood from the foregoing description and it will be apparent that I have provided a device which greatly enhances the value of pinch cocks for laboratory use, particularly where an emergency arises requiring the stoppage of flow of a fluid through tubing without unnecessary delay.

Obviously various changes may be made in the form, construction and arrangement of the parts without departing from the spirit and scope of the invention of sacrificing any of its material advantages, the form hereinbefore described being merely a preferred embodiment thereof.

I claim:

1. A pinch cock comprising a wire shaped to form a spring at its middle portion, the two ends forming jaws which are resiliently closed by said spring, the ends forming said jaws being bent backwardly in planes perpendicular to each other to provide an unobstructed passage between and in front of the jaws when open, and outwardly adjacent said spring, the outwardly bent ends having operating buttons whereby said spring may be flexed to open said jaws.

2. A pinch cock consisting of a single wire bent at its middle to form a spring and having end portions and buttons on its ends located adjacent the spring, those portions of the wire between the spring and end portions being extended outward beyond the spring and end portions and bent backward upon themselves to form arms providing jaws, and the end portions of the wire between the jaws and buttons being bent normal to the arms.

WILLIAM H. DAY.

Witnesses:
C. M. LAIDLAW,
F. B. COTSWORTH.

Copies of this patent may be obtained for five cents each, by addressing the "Commissioner of Patents, Washington, D. C."